US009053257B2

(12) United States Patent
Schreiber et al.

(10) Patent No.: US 9,053,257 B2
(45) Date of Patent: Jun. 9, 2015

(54) VOLTAGE-AWARE SIGNAL PATH SYNCHRONIZATION

(71) Applicant: Advanced Micro Devices, Inc., Sunnyvale, CA (US)

(72) Inventors: Russell Schreiber, Austin, TX (US); John Wuu, Fort Collins, CO (US); Keith Kasprak, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 89 days.

(21) Appl. No.: 13/668,705

(22) Filed: Nov. 5, 2012

(65) Prior Publication Data

US 2014/0125381 A1   May 8, 2014

(51) Int. Cl.
*H03K 19/00* (2006.01)
*G06F 17/50* (2006.01)
*G06F 13/16* (2006.01)
*H05K 3/00* (2006.01)
*G06F 13/42* (2006.01)

(52) U.S. Cl.
CPC ................ *G06F 17/50* (2013.01); *H03K 19/00* (2013.01); *G06F 13/1689* (2013.01); *G06F 17/5045* (2013.01); *H05K 3/00* (2013.01); *G06F 2217/62* (2013.01); *G06F 13/4291* (2013.01)

(58) Field of Classification Search
CPC ........... G06F 1/04; G06F 1/06; G06F 9/3869; G06F 17/5045; G06F 13/4291; G06F 13/1689; G06F 17/50; G06F 2217/62; G01R 31/318552; H03K 5/135; H03K 19/0016; H03K 19/215; H03K 19/00; G11C 2029/3202; G11C 29/32; G11C 29/48; G11C 7/1066; G11C 7/1093; G11C 7/222; G11C 7/106; G11C 7/1087; G11C 7/0008; H05K 3/00
USPC ................ 326/93–98, 12; 716/101, 110, 119; 327/200–218
See application file for complete search history.

(56) References Cited

U.S. PATENT DOCUMENTS

| | | | | | |
|---|---|---|---|---|---|
| 5,627,841 | A * | 5/1997 | Nakamura | ..................... | 714/731 |
| 6,396,307 | B1 * | 5/2002 | Kawakami et al. | ........... | 326/121 |
| 6,853,322 | B2 * | 2/2005 | Dedic | ............ | 341/144 |
| 7,808,293 | B2 * | 10/2010 | Fujisawa | ....................... | 327/295 |
| 8,013,654 | B1 * | 9/2011 | Chen et al. | ..................... | 327/261 |
| 8,332,800 | B2 * | 12/2012 | Jarrett | ............................ | 716/132 |
| 8,434,047 | B1 * | 4/2013 | Jiang et al. | ..................... | 716/133 |
| 8,572,539 | B2 * | 10/2013 | Cortadella et al. | ............ | 716/118 |

* cited by examiner

*Primary Examiner* — Vibol Tan

(57) ABSTRACT

An integrated circuit (IC) generates clock delay control signals based on its operational voltage level. The clock delay control signals are routed to corresponding clock gating logic that controls the synchronous capturing of the outputs of corresponding signal paths. The clock gating logic delays the clock signal used by the corresponding flip-flop in response to an assertion of the corresponding received clock delay control. Thus, the clock signal used to capture the outputs of certain signal paths may be delayed under certain voltage conditions. This selective clock path delay for different signal paths enables the IC to use a higher clock frequency, or more reliably latch the path outputs at a certain clock frequency, even though different signal paths may exhibit different relative path delays under different operating voltage conditions.

20 Claims, 4 Drawing Sheets

LOW VOLTAGE POWER MODE (LOW_V_DLY ASSERTED)

HIGH VOLTAGE POWER MODE (HIGH_V_DLY ASSERTED)

VOLTAGE-AWARE SIGNAL PATH SYNCHRONIZATION

BACKGROUND

1. Field of the Disclosure

The present disclosure generally relates to synchronous circuits and, more particularly, to synchronous capturing of outputs of signal paths of integrated circuits.

2. Description of the Related Art

Integrated circuits often employ synchronous digital signal paths. Typically, the synchronization of such paths is achieved through the use of clocked flip-flops that capture the output signal of a corresponding signal path responsive to an edge or state of a clock signal. However, different signal paths may exhibit different degrees of path delay depending on the voltage level at which the circuitry is operated. Those signal paths for which the signal propagation delay is primarily due to transistor gate delays ("gate-dominated signal paths") often limit the maximum clocking frequency at lower voltages, whereas those signal paths for which the signal propagation delay is primarily due to resistor-capacitor (RC) effects ("RC-dominated signal paths") tend to have signal propagation delays that do not materially scale with voltage. As such, gate-dominated signal paths tend to speed up with increases in operating voltage, whereas RC-dominated signal paths largely stay the same. Accordingly, the signal paths for the integrated circuit typically are configured so as to achieve a relative maximum frequency suitable for both low voltage operation and high voltage operation, which typically results in the signal paths being less than ideal for any one mode of operation.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

The use of the same reference symbols in different drawings indicates similar or identical items.

DETAILED DESCRIPTION

Figure 1:
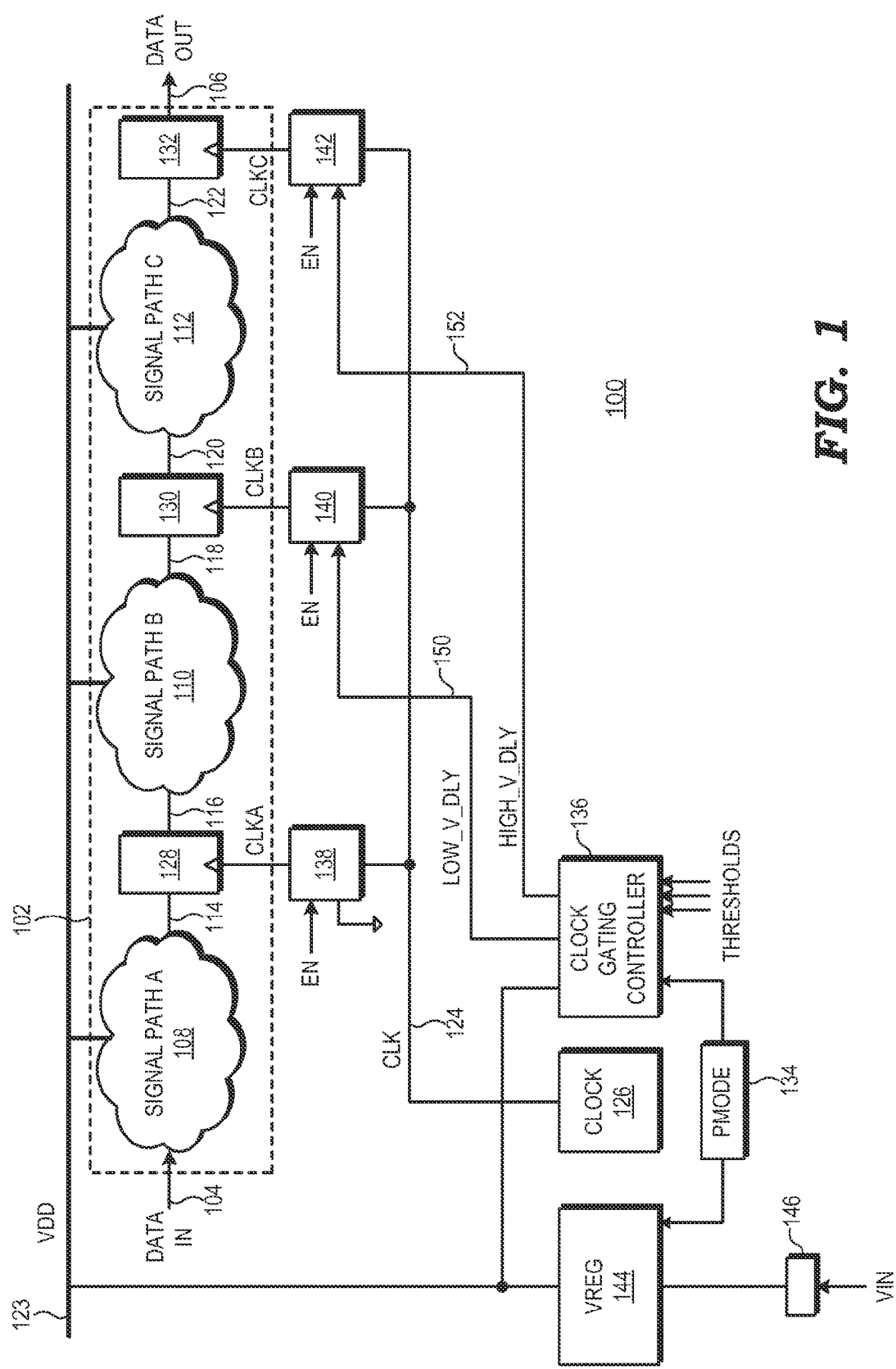
FIG. 1 is a diagram illustrating an integrated circuit employing variable-delay clock gating logic in accordance with some embodiments.

FIGS. 1-7 illustrate example techniques for synchronization of signal paths in an integrated circuit so as to more fully optimize the maximum clock frequency that can be employed across the signal paths at a given operational voltage level. In some embodiments, the integrated circuit generates one or more clock delay control signals based on a power mode of the integrated circuit. The power mode can be identified based on a power mode indicator stored at the integrated circuit (e.g., an indicator of the wake state of the integrated circuit) or based on a comparison of the level of the operational voltage used to operate the circuitry of the signal paths to one or more thresholds. Each clock delay control signal represents whether a corresponding voltage mode is currently implemented for the operational voltage. The one or more clock delay control signals are generated based on the power mode of the integrated circuit, such as via the comparison of the current level of the operational voltage to one or more thresholds or by asserting or deasserting the clock delay control signals based on the power mode indicator. The one or more clock delay control signals are routed to the clock inputs of corresponding clock gating logic that control the synchronous capture of the outputs of corresponding signal paths in the integrated circuits. The clock gating logic, in some embodiments, delays the clock signal used by the corresponding flip-flop in response to an assertion of the clock delay control signal received by the clock gating logic. Thus, the clock signal used to capture the outputs of certain signal paths may be delayed under certain voltage conditions, whereas the clock signal used to capture the outputs of other signal paths may be delayed under different voltage conditions. As such, by selectively delaying the clock signal used to capture the output of different signal paths, the integrated circuit may be able to use a higher clock frequency, or more reliably capture the path outputs at a given clock frequency, even though different signal paths may exhibit different signal propagation delays under different voltage conditions.

To illustrate, those signal paths having relatively long signal traces often have signal propagation delays that are primarily due to resistive-capacitive (RC) delay (and hence referred to herein as "RC-dominated signal paths"). RC delays typically do not materially change due to changes in operational voltage and, as such, an increase in the operational voltage does not significantly alter the signal propagation delay in such RC-dominated signal paths. Conversely, those signal paths for which the signal propagation delay is primarily due to transistor gate delay (referred to herein as "gate-dominated signal paths") typically have reduced maximum frequencies at lower voltages as the transistor gate delays increase with a decrease in the operational voltage operating the transistor gates. Thus, a change in operational voltage of an integrated circuit changes the path delays of gate-dominated paths of the integrated circuit relative to the path delays of RC-dominated paths of the integrated circuit, and thus affects the timing of the capture and launch of signals between such paths. Thus, in an integrated circuit implementation whereby a gate-dominated signal path is in series with an RC-dominated signal path, the clock delay control signals can be configured so as to direct the clock gating logic to delay the clock used by a flip-flop to capture a signal output by the gate-dominated signal path when the integrated circuit device is operating in a low voltage mode and to direct the clock gating logic to delay the clock used by a latch to capture a signal output by the RC-dominated signal path when the integrated circuit device is operating in a high voltage mode. As such, a higher maximum frequency can be used for the clock signal at any given voltage level, rather than having to settle for a clock frequency that otherwise would be acceptable for use for both the gate-dominated signal path and the RC-dominated signal path at all voltage corners.

FIG. 1 illustrates an example integrated circuit (IC) 100 implementing voltage-aware signal-path synchronization in accordance with some embodiments. In the depicted example, the IC 100 includes circuitry implemented on one or more die, such as in an integrated circuit package, multi-chip module (MCM), system on a chip (SoC), and the like. The circuitry can include any variety of circuit elements and combinations thereof, such as transistors and other active circuit elements, and resistors, capacitors, fuses, diodes, and other passive circuit elements. The IC 100 includes a signal path 102 having an input to receive a data signal 104 labeled "DATA IN" and an output to provide a data signal 106 labeled "DATA OUT." In the depicted example, the signal path 102 is itself composed of a plurality of signal paths connected in series, including a signal path 108 having an input to receive the data signal 104 and an output to provide a data signal 114, a signal path 110 having an input to receive a data signal 116 and an output to provide a data signal 118, an a signal path 112 having an input to receive a data signal 120 and an output to provide a data signal 122. The signal paths 108, 110, and 112 (and the signal path 102) also can include other input signals or output signals (not illustrated). Each of the signal paths 108, 110, and 112 is operated using an operational voltage 123 (denoted "VDD"), or an operational voltage derived from the operational voltage VDD.

The signal path 102 is a synchronous signal path, whereby various signals can be synchronized to a clock signal 124, also labeled "CLK". The clock signal 124 is provided by a clock source 126, which can include an on-chip clock generator (e.g., an oscillator) or a phase-locked loop (PLL) or other clock conditioning circuit to provide the clock signal 124 based from a clock signal generated off-chip. In order to synchronize the signal path 102 to the clock signal 124, the IC 100 employs clocked flip-flops (or "flops") 128, 130, and 132 at the output of each of the signal paths 108, 110, and 112 of the signal path 102. The flop 128 has a data input to receive the data signal 114, a clock input to receive a clock signal labeled "CLKA", and a data output to provide the data signal 116, which represents the data signal 114 captured or otherwise synchronized based on the clock signal CLKA. Likewise, the flop 130 has a data input to receive the data signal 118, a clock input to receive a clock signal labeled "CLKB", and a data output to provide the data signal 120, which represents the data signal 118 captured or otherwise synchronized based on the clock signal CLKB. The flop 132 has a data input to receive the data signal 122, a clock input to receive a clock signal labeled "CLKC", and a data output to provide the data signal 106, which represents the data signal 122 captured or otherwise synchronized based on the clock signal CLKC. The flops 128, 130, and 132 can include any of a variety of clocked data synchronization elements, including, but not limited to, clocked D-flops, SR-flops, T-flops, and JK-flops, as well as other types of clocked or synchronous latching elements. The clock signals CLKA, CLKB, and CLKC are selectively-delayed representations of the clock signal CLK, as described in greater detail herein.

The IC 100 is configurable to operate in different power modes, whereby each power mode employs a different frequency for the clock signal 124. As an increase in clock frequency typically requires an increase in the level of the operational voltage VDD in order to ensure proper operation of the IC 100, each power mode typically employs a specified frequency/voltage level combination. For example, the IC 100 may employ one power state whereby the clock signal 124 is operated at 1 gigahertz (GHz) with a 1.5 volt (V) level for the operational voltage VDD, and employ another power state whereby the clock signal 124 is operated at 2 GHz with a 3.3 V level for the operational voltage VDD. The power mode of the IC 100 can be identified or controlled by a power mode indicator labeled "PMODE" that is stored in a storage element 134 at the IC 100, or otherwise made accessible to the IC 100. The storage element 134 can include, for example, a register, a cache, a volatile or non-volatile memory, a set of one or more fuses, and the like. For example, the IC 100 can include at least a portion of the circuitry of a processor that implements standardized power management states, such as those promulgated by the Advanced Configuration and Power Interface (ACPI) specification, and the power mode indicator PMODE could, in this scenario, include an indicator of the power state of the processor, such as a P0 power-performance state or a C3 sleep state. The power mode of the IC 100 instead may be identified using a voltage comparator that compares the operational voltage VDD against one or more thresholds.

In some embodiments, the path delays of the signal paths of the IC 100 do not change proportionally across the different power/frequency configurations implementable by the IC 100. To illustrate, the various signal paths can be categorized as RC-dominated, gate-dominated, or balanced signal paths (that is, signal paths that are not particularly RC-dominated or particularly gate-dominated). RC-dominated signal paths typically include relatively long signal traces which introduces significant RC delay effects into the delay path. As noted above, these RC delay effects typically do not substantially scale with voltage, and thus the path delay of an RC-dominated signal path stays approximately the same regardless of operational voltage and thus has a maximum frequency fmax that scales less with voltage compared to balanced signal paths. In contrast, gate-dominated signal paths experience path delays that can materially scale with the operational voltage. As such, the delay experienced by gate-dominated paths is relative to the level of the operational voltage VDD and thus a gate-dominated signal path typically has a maximum frequency fmax that scales more with voltage compared to balanced signal paths.

Accordingly, in some embodiments, rather than design the signal paths 108-112 so as to provide a balanced fmax for both low and high voltage operation (and thus be less than optimal for either corner), the IC 100 instead employs selective synchronization delay at the outputs of the signal paths 108-112 so as to accommodate their varying path delays under different voltage conditions, and thus more fully optimize the signal paths 108-112 across voltage corners. To this end, the IC 100 includes a clock gating controller 136 and clock gating logic 138, 140, and 142 for controlling the clocking of the data signal capturing performed by the flops 128, 130, and 132, respectively. The clock gating logic 138, 140, and 142 is also collectively referred to herein as "the clock gating logic" of the IC 100.

The clock gating controller 136 is configured to generate one or more clock delay control signals based on the current level of the operational voltage VDD. In some embodiments, the clock gating controller 136 includes an input to receive an indication of the current level of the operational voltage VDD, an input to receive an indication of one or more thresholds, and outputs to provide the one or more clock delay control signals based on a comparison of the indicated operational voltage level to the indicated thresholds. For example, the clock gating controller 136 could include a digital implementation with an input to receive the power mode indicator PMODE from the storage element 134, and a look-up table or other mapping of the power mode indicator PMODE to the corresponding operational voltage level used for the power mode indicated by the power mode indicator PMODE. The clock gating controller 136 can compare the identified voltage level with one or more preset voltage threshold values to determine which clock delay control signal to assert, if any. As another example, the IC 100 could include a voltage regulator 144 that generates the operational voltage VDD from an input voltage VIN received at via an pin 146 or other input, and the clock gating controller 136 can include an analog implementation with an input coupled to the output of the voltage regulator 144 to receive the operational voltage VDD and inputs coupled to receive voltages representative of the one or more thresholds. The clock gating controller 136 can include one or more comparators to compare the operational voltage VDD to the thresholds in order to determine which of the clock delay control signal to assert, if any.

In some embodiments, the thresholds may be programmed or otherwise configured during one or both of manufacture or operation. For example, in the digital implementation example described above, the threshold could be stored in a register or other programmable storage element and thus dynamically configurable by a software application. In the analog implementation described above, the threshold can programmed by, for example, programming fuses or trimming resistors during, for example, silicon bring-up. Alternatively, the IC 100 can include built-in self-test (BIST) logic or other test logic that can evaluate the delay paths 108-112 at start-up and dynamically configure the particular thresholds accordingly.

Each of the clock gating logic 138, 140, and 142 includes a clock input to receive the clock signal 124, an input to receive an enable signal labeled "EN", and an input to receive a corresponding clock delay control signal. The enable signal EN is asserted when the signal path 102 is in an operational mode and deasserted when the signal path 102 is in a non-operational mode (e.g., is being clock gated). As described in greater detail below with reference to FIGS. 4 and 5, in some embodiments the clock gating logic includes a clock output to provide a clock signal to the corresponding flop, whereby the clock gating logic delays the clock signal provided to the flop when the corresponding clock delay control signal is asserted, thereby introducing a delay in the capturing of the input signal relative to the signal capturing performed for other signal paths. As described below with reference to FIGS. 4 and 5, the delay in the clock signal can be introduced through, for example, the use of delay buffers or by decreasing the drive strength of combinational logic that drives the output clock signal (e.g., by decreasing the number of drive legs driving the output clock signal). In this approach, the clock gating logic 138 includes an output to provide the clock signal CLKA based on the clock signal CLK, the clock gating logic 140 includes an output to provide the clock signal CLKB based on the clock signal CLK, and the clock gating logic 142 includes an output to provide the clock signal CLKC based on the clock signal CLK.

In the depicted example, the clock gating controller 136 provides two clock delay control signals: a clock delay control signal 150 (labeled "HIGH_V_DLY") that is asserted when the level of the operational voltage VDD is at or above a threshold VH; and a clock delay control signal 152 (labeled "LOW_V_DLY") that is asserted when the level of the operational voltage VDD is at or below a threshold VL. When the operational voltage VDD is between the threshold VL and VH, neither of the clock delay control signals 150 and 152 is asserted. As such, the clock delay control signals 150 and 152 are zero one hot (that is, at most one of the clock delay control signals 150 and 152 is asserted for any given level of the operational voltage VDD). Further, the signal path 108 comprises a balanced signal path, the signal path 110 comprises a gate-dominated signal path, and the signal path 112 comprises a RC-dominated signal path. Accordingly, the clock delay control input of the clock gating logic 138 is fixed, the clock delay control input of the clock gating logic 140 receives the clock delay control signal 150 (labeled "LOW_V_DLY"), and the clock delay control input of the clock gating logic 142 receives the clock delay control signal 152 (labeled "HIGH_V_DLY").

Under this example configuration, when the operational voltage VDD is above the high threshold VH, the IC 100 is expected to be operating at a relatively high voltage, and thus the signal path 110, being a gate-dominated signal path, is likely to experience a relatively lower path delay under these conditions compared to the RC-dominated signal path 112. Accordingly, the assertion of the clock delay control signal 152 under this operating point controls the clock gating logic 142 to delay the clock signal CLKC provided to the flop 132 while allowing the flops 128 and 130 to latch without an introduced clock delay, and thereby accommodating for the relatively greater delay likely to be present in the signal path 112 compared to the path delays of the signal paths 108 and 110 under this operating condition.

Conversely, when the operational voltage VDD is at or below the low threshold VL, the IC 100 is expected to be operating at a relatively low voltage, and thus the gate-dominated signal path 110 experiences a higher path delay under these conditions relative to the RC-dominated signal path 112. Accordingly, the assertion of the clock delay control signal 150 under this operating point controls the clock gating logic 140 to delay the clock signal CLKB provided to the flop 130 while allowing the flops 128 and 132 to capture without an introduced delay, and thereby accommodating for the relatively greater delay likely to be present in the signal path 110 compared to the path delay of the signal path 112 under this operating condition.

When the operational voltage VDD is between the low threshold VL and the high threshold VH, each of the signal paths 108, 110, and 112 are expected to exhibit relatively proportional or similar path delays under this operating condition. As such, it is less beneficial to delay the capturing of one of the signal paths relative to the other signal paths. Accordingly, no clock delay control signals are asserted, and therefore no clock delay is introduced for any of the flops 128-132 in the signal path 102 under these operating conditions. By using selective clock delay for the signal paths 108-112 based on the voltage-based delay characteristics of the signal paths and the current voltage level of the IC 100, the IC 100 can accommodate for the non-uniform, voltage-dependent path delay characteristics of the signal paths 108-112 and thus can allow the signal paths to more fully achieve their maximum frequency at any particular voltage corner.

Although FIG. 1 illustrates an example whereby two voltage thresholds are used to define three voltage regions for purposes of selective clock delay, a single voltage threshold may be used to define two voltage regions for this purpose, or more than two voltage thresholds may be used to define more than three voltage regions. Moreover, while certain embodiments implement a binary approach whereby either no intended delay is introduced or a fixed intended delay is introduced, other embodiments can implement a multiple-delay level approach whereby the delay introduced into a clock signal used to capture the output signal of a data path can vary depending on operating conditions. For example, a small delay can be introduced into a clock signal used to capture the output of a gate-dominated path at mid-level operational voltages, and a larger delay can be introduced into the clock signal for lower-level operational voltages.

Figure 2:
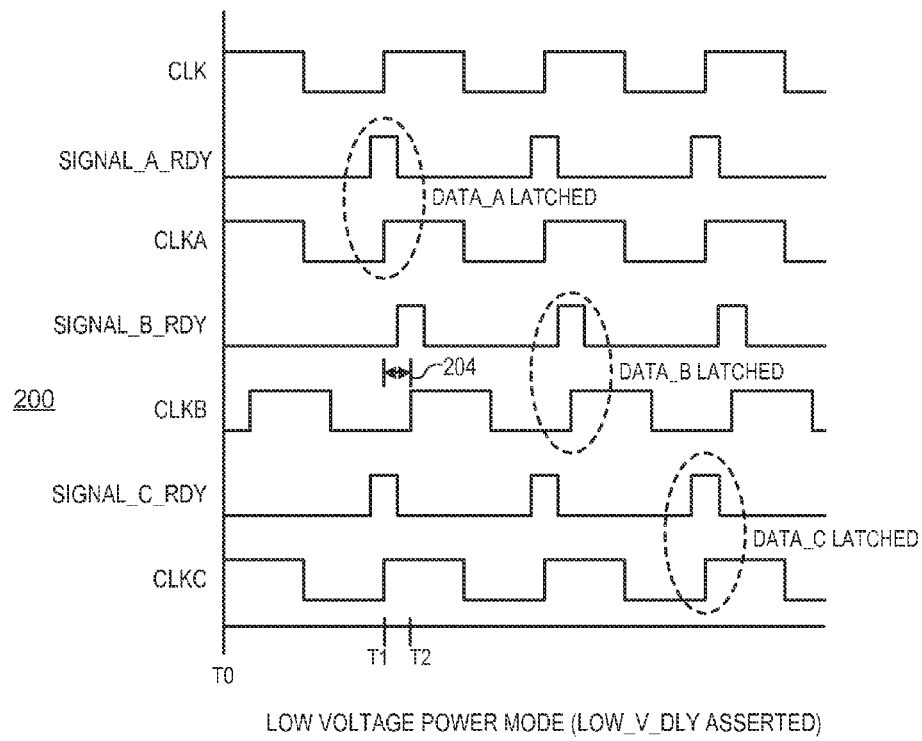
FIG. 2 is a timing diagram illustrating an example operation of the integrated circuit of FIG. 1 in a lower power mode in accordance with some embodiments.
Figure 3:
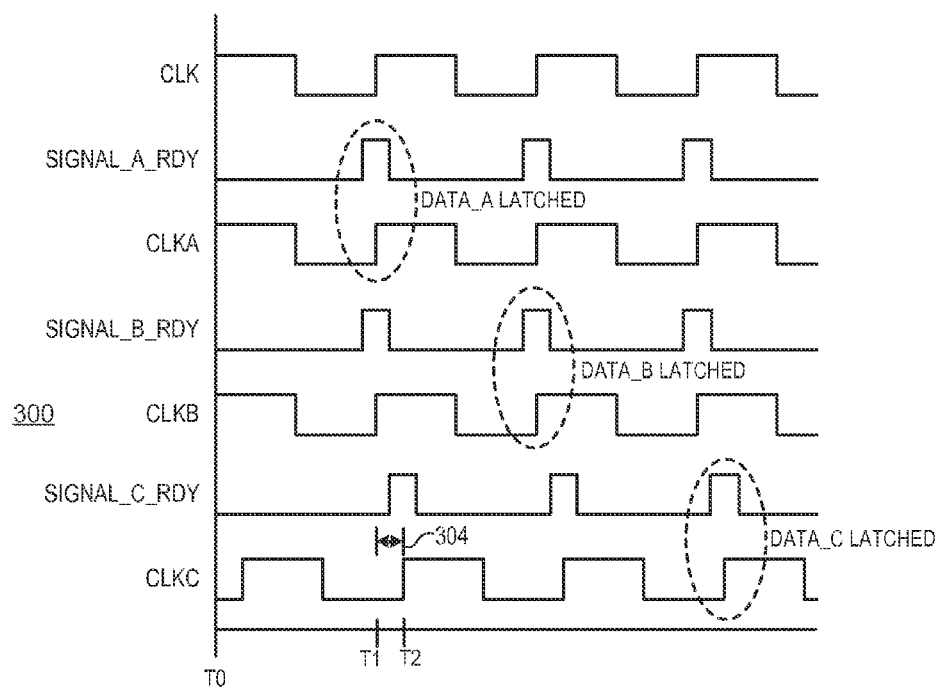
FIG. 3 is a timing diagram illustrating an example operation of the integrated circuit of FIG. 1 in a higher power mode in accordance with some embodiments.

FIGS. 2 and 3 illustrate timing diagrams that demonstrate examples of the operation of the flops 128-132, clock gating logic 138-142, and clock gating controller 136 of the IC 100 of FIG. 1. The timing diagram 200 of FIG. 2 illustrates an example whereby the level of the operational voltage VDD is less than the low voltage threshold VL, and thus the clock delay control signal 150 (LOW_V_DLY) is asserted. The timing diagram 200 illustrates the states of various signals over several cycles of the clock signal 124 (CLK), including the clock signals CLKA, CLKB, and CLKC, and signals SIGNAL_A_RDY, SIGNAL_B_RDY, and SIGNAL_C_RDY. A logic "high" state of the signal SIGNAL_A_RDY indicates that the signal 114 output by the signal path 108 is ready to be captured by the flop 128. A logic "high" state of the signal SIGNAL_B_RDY indicates that the signal 118 output by the signal path 112 is ready to be captured by the flop 130. A logic "high" state of the signal SIGNAL_C_RDY indicates that the signal 122 output by the signal path 112 is ready to be captured by the flop 132.

As noted above, the operational voltage VDD being less than the threshold voltage VL indicates that the gate-dominated signal path 110 is likely to have a greater path delay relative to the RC-dominated signal path 112. Accordingly, the clock signal CLK may be supplied as clock signals CLKA and CLKC without any inserted delay, and thus the data signal 114 and the data signal 122 are captured at each rising edge of the clock signal CLK. However, because the signal path 110 is gate-dominated and thus has a relatively greater delay at a lower voltage operating point, the time T2 at which the data signal 118 is ready to be captured is delayed by a delay 204 relative to the time T1 the data signals 114 and 122 are ready to be captured. Accordingly, the clock gating logic 140 delays the clock signal CLKB by a delay amount commensurate with the delay 204 so that the flop 130 latches the data signal 118 at the appropriate time. However, this inserted delay typically is relatively small relative to the total clock period, thereby allowing the signal path 112 to process the data signal 120 captured by the delayed clock signal CLKB in time so that the resulting data signal 122 is ready to be subsequently captured by the flop 132 at the next rising edge of the clock signal CLKC.

The timing diagram 300 of FIG. 3 illustrates an example whereby the level of the operational voltage VDD is greater than the high voltage threshold VH, and thus the clock delay control signal 152 (HIGH_V_DLY) is asserted. As noted above, the operational voltage VDD being greater than the threshold voltage VH indicates the gate-dominated signal path 110 is likely to have a lower path delay relative to the RC-dominated signal path 112. Accordingly, the clock signal CLK may be supplied as clock signals CLKA and CLKB without any inserted delay, and thus the data signal 114 and the data signal 1118 are captured at each rising edge of the clock signal CLK. However, because the signal path 112 is RC-dominated and the signal path 110 is gate-dominated, the signal path 112 has a relatively greater delay at a high-voltage operating point relative to the signal path 110 under these operating conditions. As such, the time T2 at which the data signal 122 is ready to be captured is delayed by a delay 304 relative to the time T1 the data signals 114 and 118 are ready to be captured. Accordingly, the clock gating logic 142 delays the clock signal CLKC by a delay amount commensurate with the delay 304 so that the flop 132 latches the data signal 122 at the appropriate time.

Figure 4:
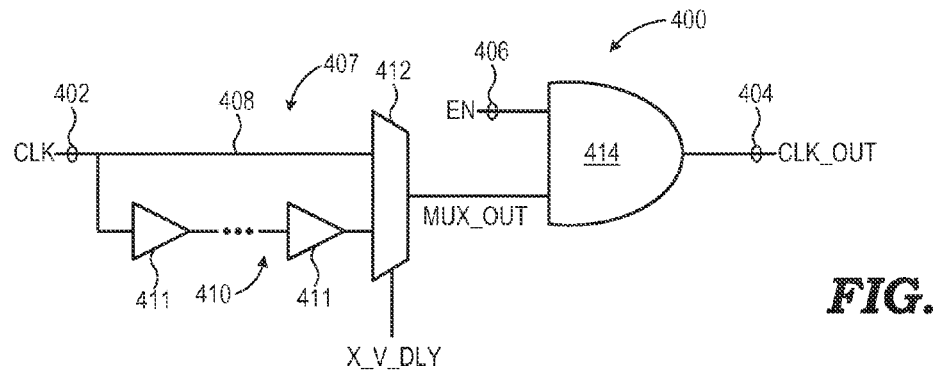
FIG. 4 is a circuit diagram illustrating a delay-buffer-based implementation of variable-delay clock gating logic in accordance with some embodiments.

FIG. 4 illustrates an example implementation of clock gating logic 400 in accordance with some embodiments. The clock gating logic 400 corresponds to any of the clock gating logic 138, 140, or 142 of the IC device 100 of FIG. 1. The clock gating logic 400 includes an input 402 to receive the clock signal CLK, an output 404 to provide a clock signal CLK_OUT (e.g., clock signals CLKA, CLKB, or CLKC of FIG. 1), an input 406 to receive the enable signal EN, a variable delay element 407 comprising a plurality of delay paths, each delay path having an input to receive the clock signal CLK and an output to provide a delayed representation of the clock signal, whereby each delay path introduces a different amount of delay into the clock signal CLK. For example, the variable delay element 407 could include a delay path 408 with effectively no delay and a delay path 410 with a delay introduced by a series of one or more buffers 411. In a multiple-delay level implementation, the variable delay element 407 could employ three or more delay paths with different path delays. The variable delay element 407 further includes a multiplexer 412 having a plurality of inputs coupled to the outputs of the delay paths 408 and 410, a selection input to receive a clock delay control signal labeled "X_V_DLY" (e.g., the LOW_V_DLY clock delay control signal 150 or the HIGH_V_DLY clock delay control signal 152 of FIG. 1), and an output to provide, as an output signal labeled "MUX_OUT", a selected one of the versions of the clock signal CLK as selected based on the clock delay control signal X_V_DLY. The clock gating logic 400 further includes an AND gate 414 having an input coupled to the input 406 to receive the enable signal EN, an input coupled to the output of the multiplexer 412 to receive the selected version of the clock signal CLK, and an output coupled to the output 404 to provide as the clock signal CLK_OUT the result of a logical AND operation of the enable signal EN and the selected version of the clock signal CLK.

In operation, the delay paths of the variable delay element 407 generate different versions of the clock signal CLK, one without any introduced delay (e.g., effectively the original clock signal CLK) and one with an introduced delay. The state of the clock delay control signal X_V_DLY controls which version is supplied to the AND gate 414 and thus controls which version is supplied as the output clock signal CLK_OUT (assuming the enable signal EN is asserted). Thus, when the clock delay control signal X_V_DLY is not asserted, the clock signal CLK is provided as the output clock signal CLK_OUT without inserted delay. When the clock delay control signal X_V_DLY is asserted, a delayed representation of the clock signal CLK is provided as the output clock signal CLK_OUT.

Figure 5:
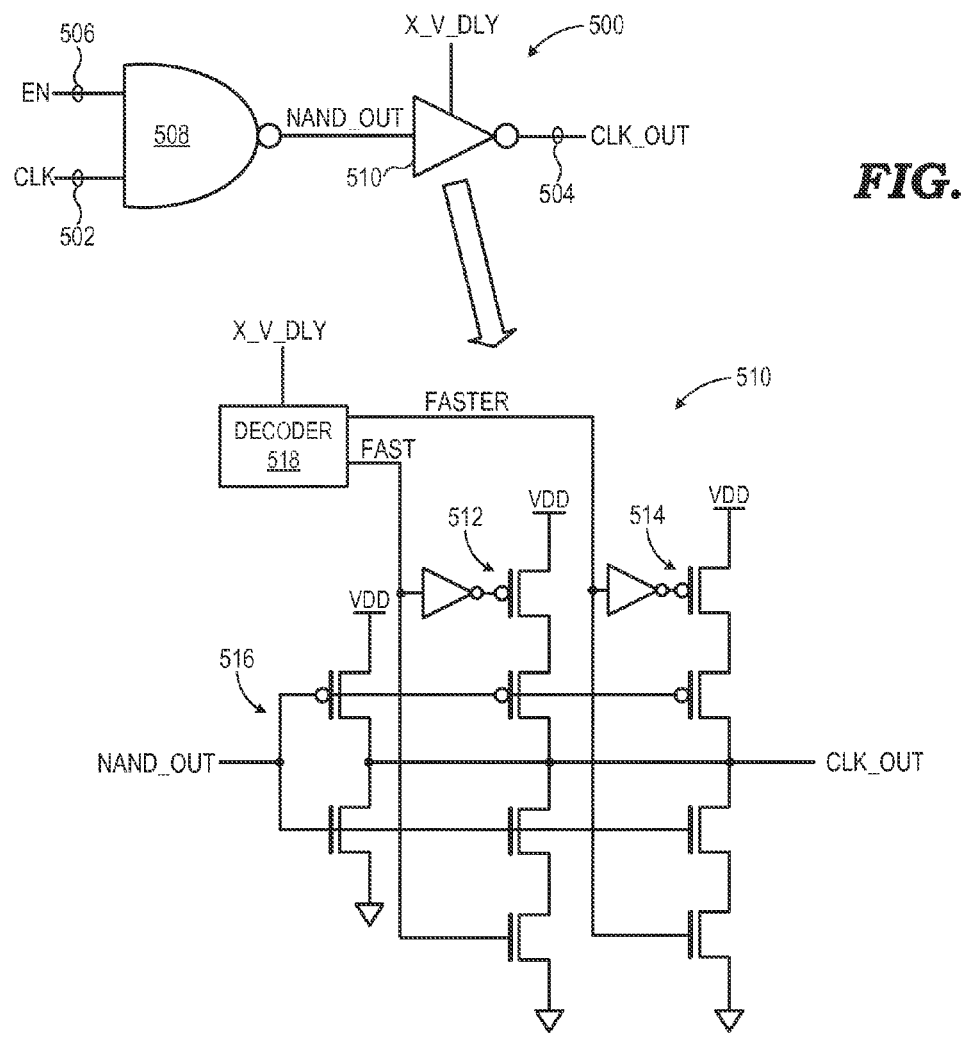
FIG. 5 is a circuit diagram illustrating a drive-strength-based implementation of variable-delay clock gating logic in accordance with some embodiments.

FIG. 5 illustrates an example implementation of clock gating logic 500 in accordance with some embodiments. The clock gating logic 500 corresponds to any of the clock gating logic 138, 140, or 142 of the IC device 100 of FIG. 1. Although FIG. 5 illustrates an example NAND-inverter implementation, other combinatorial logic having variable drive strength based on selective drive leg activation may be used to selectively introduce a delay into an output clock signal using the guidelines provided herein.

The clock gating logic 500 includes an input 502 to receive the clock signal CLK, an output 504 to provide a clock signal CLK_OUT (e.g., clock signals CLKA, CLKB, or CLKC of FIG. 1), an input 506 to receive the enable signal EN, a NAND gate 508 and an inverter 510. The NAND gate 508 includes an input coupled to the input 502 to receive the clock signal CLK, an input coupled to the input 506 to receive the enable signal EN and an output to provide a signal labeled "NAND_OUT." The inverter 510 includes an input coupled to the output of the NAND gate 508 to receive the signal NAND_OUT, an input to receive a clock delay control signal labeled "X_V_DLY" (e.g., the HIGH_V_DLY clock delay control signal 150 or the LOW_V_DLY clock delay control signal 152 of FIG. 1), and an output to provide the clock signal CLK_OUT.

In operation, the inverter 510 implements output drive logic that provides an adjustable or otherwise variable signal drive strength, and thus enables the adjustment of the speed at which the output clock signal CLK_OUT transitions between a high state and a low state based on the state of the clock delay control signal X_V_DLY. Thus, when the clock delay control signal X_V_DLY is not asserted, no delay is to be introduced by the clock gating logic 500, and thus the inverter 510 drives the output clock signal CLK_OUT without delay. However, when the clock delay control signal X_V_DLY is asserted, a delay is to be introduced by the clock gating logic 500, and thus the inverter 510 decreases its drive strength, and thereby, in effect, introducing a delay into the output clock signal CLK_OUT relative to the input clock signal CLK.

FIG. 5 also illustrates an example implementation of the inverter 510. In the depicted example, the inverter 510 includes one or more additional drive legs, such as drive legs 512 and 514, coupled to the output of the inverting transistor pair 516, whereby one or more of the drive legs may be disabled to slow the drive of the inverter 510, and thus introduce a delay into the output clock signal CLK_OUT. To illustrate, the drive leg 512 may be controlled by a signal labeled "FAST" and the drive leg 512 may be controlled by a signal labeled "FASTER," and the clock gating logic 500 can include a decoder 518 that receives the clock delay control signal X_V_DLY and selectively asserts one or both of the signals FAST and FASTER based on the state of the clock delay control signal X_V_DLY. For example, when the signal X_V_DLY is asserted, thereby indicating that the clock gating logic 500 is to introduce a delay into the clock signal CLK_OUT, the decoder 518 can deassert one or both of the signals FAST and FASTER in response, thereby causing the inverter 510 to drive the clock signal CLK_OUT at a slower rate, and thus effectively introducing a delay into the clock signal CLK_OUT. However, when the signal X_V_DLY is not asserted, thereby indicating that the clock gating logic 500 is to avoid delaying the clock signal CLK_OUT, the decoder 518 can assert both of the signals FAST and FASTER in response, thereby causing the inverter 510 to drive the clock signal CLK_OUT at a faster rate, and thus effectively avoiding introduction of a delay into the clock signal CLK_OUT.

As noted above, in some embodiments, rather than take a binary approach to the introduction of delay into the clock signal, different levels of delay instead can be introduced into the output clock signal CLK_OUT. In this example, the signal X_V_DLY may be a multiple-bit signal capable of indicating more than two states, and the decoder 518 therefore can assert different combinations of the signals FAST and FASTER to affect different delay times inserted by the inverter 510. For example, in response to the signal X_V_DLY indicating a larger delay, the decoder 518 can deassert both of the signals FAST and FASTER in response, thereby causing the inverter 510 to introduce a larger delay into the output clock signal CLK_OUT. However, in response to the signal X_V_DLY indicating a smaller delay, the decoder 518 can deassert the signal FASTER but keep the signal FAST asserted in response, thereby causing the inverter 510 to introduce a smaller delay into the output clock signal CLK_OUT.

Figure 6:
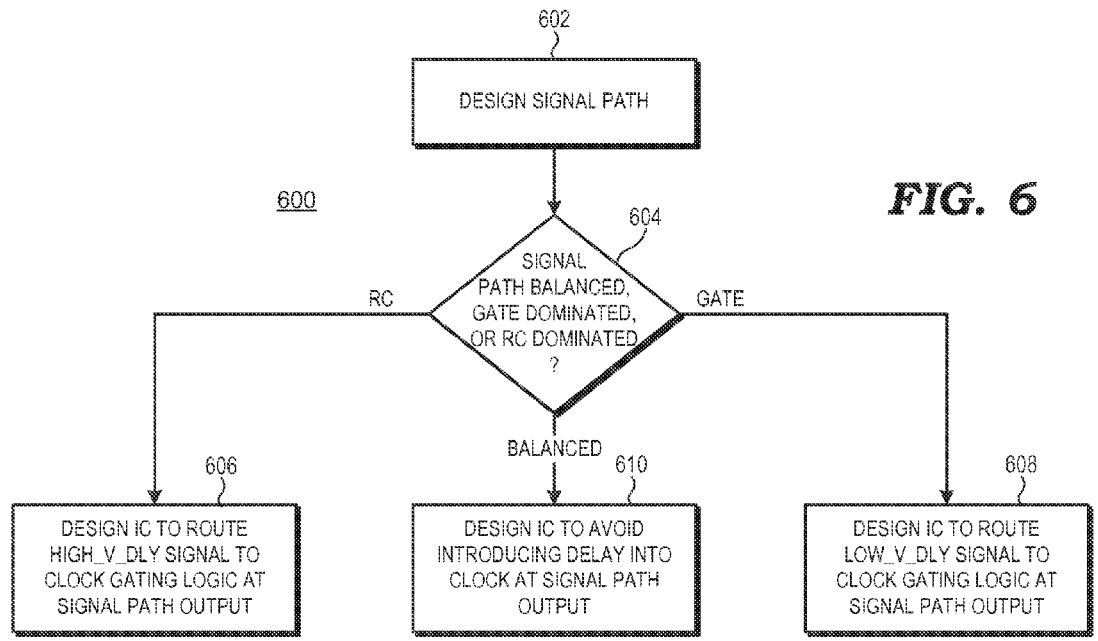
FIG. 6 is a flow diagram illustrating a method of designing an integrated circuit in accordance with some embodiments.

FIG. 6 illustrates an example method 600 implemented by a circuit designer for designing an integrated circuit (IC) so as to implement clocking delays for RC-dominated and gate-dominated signal paths at various voltage operating points in accordance with some embodiments. The circuit designer can include a human designer, a computer program executing automated circuit design software, or a combination thereof. The automated circuit design software comprises one or more software programs tangibly stored at a computer readable medium, and whereby the one or more software programs comprise instructions that, when executed, manipulate the one or more processors to perform one or more aspects of the method 600 described below. For ease of illustration, the method 600 is described in the example context of the implementation depicted in FIG. 1, whereby two clock delay control signals 150 (LOW_V_DLY) and 152 (HIGH_V_DLY) are used to control the delay timing of the clocked latches at the outputs of the delay paths.

At block 602, a circuit designer designs circuitry implementing a synchronous signal path in an integrated circuit design. The signal path includes one or more inputs to receive data signals and one or more outputs to provide data signals, whereby at least one of the output data signals is synchronized to a clock signal that is also used as the basis for synchronizing at least one other signal path in the IC design. Accordingly, at block 604, the circuit designer (or a computer system executing IC design software) determines whether the signal path designed at block 602 can be categorized as RC-dominated (that is, having a maximum frequency primarily attributable to R-C delay, which is relatively voltage independent), gate-dominated (that is, having a maximum frequency primarily attributable to transistor gate delays, which are voltage dependent), or balanced (that is, neither particularly RC-dominated or gate-dominated).

In the event that the signal path is determined to be RC-dominated, at block 606 the circuit designer designs the IC so as to route the HIGH_V_DLY clock delay control signal 152 to the clock gating logic controlling the flop at the output of the signal path so as to enable a delay of the clock signal used to control the flop when operating at a high voltage operating point. In the event that the signal path is determined to be gate-dominated, at block 608 the circuit designer designs the IC so as to route the LOW_V_DLY clock delay control signal 150 to the clock gating logic controlling the flop at the output of the signal path so as to enable a delay of the clock signal used to control the flop when operating at a low voltage operating point. In the event that the signal path is determined to be balanced, at block 610 the circuit designer designs the IC so that the clock delay control input of the clock gating logic controlling the flop at the output of the signal path is pulled to a fixed state so as to disable insertion of a delay into the clock signal used to control the flop regardless of operational voltage level.

In some embodiments, the techniques described above may be at least partially implemented by one or more processors of a processing system executing software. The software comprises one or more sets of executable instructions that, when executed by the one or more processors, manipulate the one or more processors to perform one or more aspects of the techniques described above. The software is stored or otherwise tangibly embodied on a computer readable storage medium accessible to the processing system, and can include the instructions and certain data utilized during the execution of the instructions to perform the corresponding aspects.

The integrated circuits described above are implemented as one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 7:
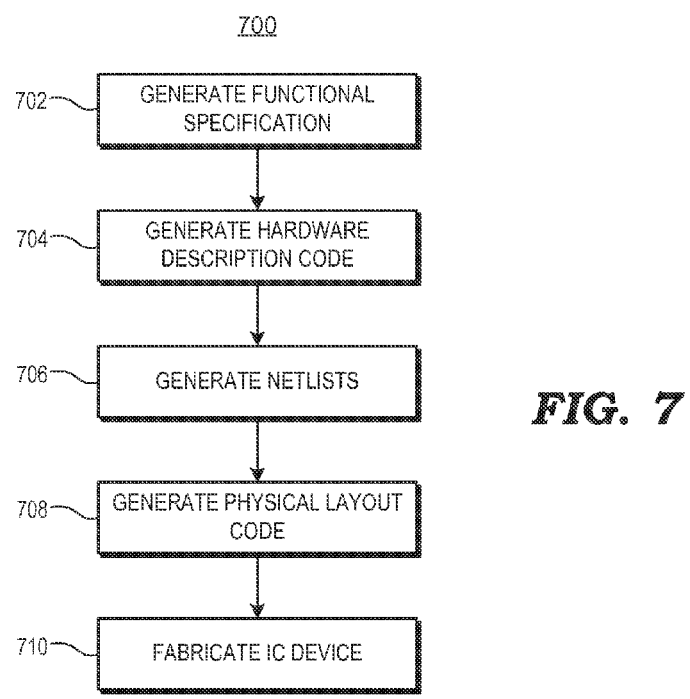
FIG. 7 is a flow diagram illustrating a method for designing and fabricating an integrated circuit device implementing variable-delay clock gating logic in accordance with some embodiments.

FIG. 7 is a flow diagram illustrating an example method 700 for the design and fabrication of an IC device implementing one or more aspects of the techniques described herein. As noted above, the code generated for each of the following processes is stored or otherwise embodied in computer readable storage media for access and use by the corresponding design tool or fabrication tool.

At block 702 a functional specification for the IC device is generated. The functional specification (often referred to as a micro architecture specification (MAS)) may be represented by any of a variety of programming languages or modeling languages, including C, C++, SystemC, Simulink, or MATLAB.

At block 704, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 706 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 708, one or more EDA tools use the netlists produced at block 706 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 710, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any features that may cause any benefit, advantage, or solution to occur or become more pronounced are not to be construed as a critical, required, or essential feature of any or all the claims.

What is claimed is:

1. An integrated circuit comprising:
   clock gating logic to selectively delay capturing of outputs of signal paths of the integrated circuit responsive to a level of an operational voltage used to power circuitry of the signal paths;
   an input to receive a first signal that is asserted responsive to the level of the operational voltage being at or above a first level;
   an input to receive a second signal that is asserted responsive to the level of the operational voltage being at or below a second level;
   wherein the clock gating logic is to delay capturing of an output of a first signal path of the integrated circuit responsive to an assertion of the first signal; and
   wherein the dock gating logic is to delay capturing of an output of a second signal path of the integrated circuit responsive to an assertion of the second signal.

2. The integrated circuit of claim 1, wherein:
   the first signal path is an RC-dominated signal path; and
   the second signal path is a gate-dominated signal path.

3. The integrated circuit of claim 1, wherein:
   the clock gating logic does not delay capturing of an output of a third signal path of the integrated circuit regardless of an assertion of the first signal or the second signal.

4. The integrated circuit of claim 1, wherein the first signal path is in series with the second signal path.

5. The integrated circuit of claim 1, further comprising:
   a clock gating controller to selectively assert the first signal and the second signal responsive to a power mode of the integrated circuit.

6. The integrated circuit of claim 5, wherein the clock gating controller is to determine the power mode of the integrated circuit based on at least one of: a power mode indicator stored at a storage element; and a comparison of the operational voltage to at least one threshold.

7. An integrated circuit comprising:
   clock gating logic to selectively delay capturing of outputs of signal paths of the integrated circuit responsive to a level of an operational voltage used to power circuitry of the signal paths;
   an input to receive a signal that is asserted responsive to the level of the operational voltage falling below a threshold; and
   wherein the clock gating logic is to delay capturing of an output of a signal path of the integrated circuit responsive to an assertion of the signal.

8. An integrated circuit comprising:
   an input to receive a first signal that is asserted responsive to the integrated circuit being in a first power mode;
   a first flip-flop comprising a data input coupled to an output of a first signal path, a data output coupled to a second signal path, and a clock input;
   first clock gating logic having an input to receive a clock signal, an input to receive the first signal, and an output coupled to the clock input of the first flip-flop, the first clock gating logic to selectively delay output of a representation of the clock signal to the clock input of the first flip-flop based on the first signal;
   an input to receive a second signal that is asserted responsive to the integrated circuit being in a second power mode;
   a second flip-flop comprising a data input coupled to an output of the second signal path, a data input coupled to a third signal path, and a clock input; and
   second clock gating logic having an input to receive the clock signal, an input to receive the second signal, and an output coupled to the clock input of the second flip-flop, the second clock gating logic to selectively delay output of a representation of the clock signal to the clock input of the second flip-flop based on the second signal.

9. The integrated circuit of claim 8, wherein:
   the first signal path is a gate-dominated signal path;
   the second signal path is an RC-dominated signal path;
   the first power mode is a lower power mode; and
   the second power mode is a higher power mode.

10. The integrated circuit of claim 8, wherein:
    the first signal path is an RC-dominated signal path;
    the second signal path is a gate-dominated signal path;
    the first power mode is a higher power mode; and
    the second power mode is a lower power mode.

11. The integrated circuit of claim 8, further comprising:
    a storage element to store a power mode indicator representing the power mode of the integrated circuit; and
    a clock gating controller comprising an input coupled to the storage element, and outputs to provide the first signal and the second signal, wherein the controller is to selectively assert the first signal and the second signal responsive to the power mode indicator.

12. The integrated circuit of claim 8, further comprising:
    a clock gating controller comprising an input to receive one or more threshold voltages, and outputs to provide the first signal and the second signal, wherein the controller is to selectively assert the first signal and the second signal responsive to a comparison of an operational voltage of the integrated circuit to the one or more threshold voltages.

13. An integrated circuit comprising:
    an input to receive a first signal that is asserted responsive to the integrated circuit being in a first power mode;
    a first flip-flop comprising a data input coupled to an output of a first signal path, a data output coupled to a second signal path, and a clock input;
    first clock gating logic having an input to receive a clock signal, an input to receive the first signal, and an output coupled to the clock input of the first flip-flop, the first clock gating logic to selectively delay output of a representation of the clock signal to the clock input of the first flip-flop based on the first signal;
    a clock input to receive the clock signal;
    a clock output to provide a representation of the clock signal;
    a multiplexer having a first input, a second input, a control input to receive a signal representative of the power mode, and an output;
    a first signal path coupling the clock input to the first input of the multiplexer; and
    a second signal path coupling the clock input to the second input of the multiplexer, the second signal path having a greater path delay than the first signal path.

14. The integrated circuit of claim 13, wherein the first clock gating logic further comprises an AND cell having a first input to receive an enable signal, a second input coupled to the output of the multiplexer, and an output coupled to the clock output.

15. An integrated circuit comprising:
    an input to receive a first signal that is asserted responsive to the integrated circuit being in a first power mode;
    a first flip-flop comprising a data input coupled to an output of a first signal path, a data output coupled to a second signal path, and a clock input; and
    first clock gating logic having an input to receive a clock signal, an input to receive the first signal, and an output coupled to the clock input of the first flip-flop, the first clock gating logic to selectively delay output of a representation of the clock signal to the clock input of the first flip-flop based on the first signal; and combinational logic having a clock input to receive the clock signal, a clock output to provide a representation of the clock signal, and output drive logic having a variable signal drive strength based on the first signal.

16. A method of operating an integrated circuit, the method comprising:

selectively delaying capturing of outputs of signal paths of the integrated circuit based on a level of an operational voltage used to power circuitry of the signal paths, wherein selectively delaying capturing of outputs comprises:

selectively delaying capturing comprises delaying capturing of an output of a first signal path of the integrated circuit responsive the level of the operational voltage being at or above a first level; and selectively delaying capturing comprises delaying capturing of an output of a second signal path of the integrated circuit responsive the level of the operational voltage being at or below a second level.

17. The method of claim 16, wherein:

the first signal path is an RC-dominated signal path; and the second signal path is a gate-dominated signal path.

18. A method of operating an integrated circuit, the method comprising:

selectively delaying capturing of outputs of signal paths of the integrated circuit based on a level of an operational voltage used to power circuitry of the signal paths;

determining a power mode of the integrated circuit based on at least one of: a power mode indicator stored at a storage element; and a comparison of the operational voltage to at least one threshold; and wherein selectively delaying capturing comprises selectively delaying capturing based on the power mode.

19. The method of claim 16, wherein the first signal path is in series with the second signal path.

20. The method of claim 16, further comprising:

selectively asserting the first signal and the second signal responsive to a power mode of the integrated circuit.

\* \* \* \* \*